(12) United States Patent
Shirono (10) Patent No.: US 8,493,506 B2
(45) Date of Patent: Jul. 23, 2013

(54) IMAGING DEVICE UNIT AND IMAGING APPARATUS FOR REMOVING DUST FROM AN OPTICAL DEVICE

(75) Inventor: Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 598 days.

(21) Appl. No.: 12/608,149

(22) Filed: Oct. 29, 2009

(65) Prior Publication Data
US 2010/0110262 A1    May 6, 2010

(30) Foreign Application Priority Data

Nov. 6, 2008  (JP) ................................. 2008-285351

(51) Int. Cl.
*H04N 5/225*    (2006.01)

(52) U.S. Cl.
USPC ............................. 348/374; 348/340; 348/342

(58) Field of Classification Search
None
See application file for complete search history.

(56) References Cited

U.S. PATENT DOCUMENTS

| | | | |
|---|---|---|---|
| 7,006,138 B2 | 2/2006 | Kawai | |
| 2003/0202114 A1* | 10/2003 | Takizawa et al. | 348/335 |
| 2003/0214599 A1* | 11/2003 | Ito et al. | 348/335 |
| 2004/0012714 A1* | 1/2004 | Kawai | 348/374 |
| 2006/0279638 A1* | 12/2006 | Matsuda et al. | 348/208.7 |
| 2007/0103554 A1* | 5/2007 | Kaihara et al. | 348/207.99 |
| 2007/0103579 A1* | 5/2007 | Niwamae et al. | 348/335 |
| 2007/0212058 A1* | 9/2007 | Kawai | 396/429 |
| 2008/0068488 A1* | 3/2008 | Kawai | 348/335 |
| 2008/0226285 A1 | 9/2008 | Matsumoto | |
| 2008/0297646 A1 | 12/2008 | Urakami et al. | |
| 2009/0153966 A1 | 6/2009 | Matsumoto | |

FOREIGN PATENT DOCUMENTS

| | | |
|---|---|---|
| JP | 2002-204379 A | 7/2002 |
| JP | 2003-319222 A | 11/2003 |
| JP | 2003-338965 A | 11/2003 |
| JP | 2007-065195 A | 3/2007 |
| JP | 2008-177845 A | 7/2008 |
| JP | 2008-211629 A | 9/2008 |
| JP | 2008-236669 A | 11/2008 |
| JP | 2008-301271 A | 12/2008 |
| JP | 2009-135910 A | 6/2009 |
| JP | 2009-159268 A | 7/2009 |
| KR | 10-2008-0083579 A | 9/2008 |

OTHER PUBLICATIONS

Notice of Allowance issued for JP 2008-285351 (Nov. 13, 2012).

* cited by examiner

*Primary Examiner* — John Villecco
*Assistant Examiner* — Dwight C Tejano
(74) *Attorney, Agent, or Firm* — Drinker Biddle & Reath LLP (57) ABSTRACT

An imaging device unit completely removing dust attached to an optical device and an imaging apparatus. The imaging device includes: an imaging device including an imaging surface on which an optical image of a subject is formed and converting the optical image into an electric signal; a low pass filter (LPF) disposed between the imaging device and the subject; a plate mounted on a peripheral portion of the LPF and including arm units extending in a direction parallel to the plate; a piezoelectric device mounted on the plate and vibrating the plate and the LPF; and a support frame that surface-contacts with the arm units of the plate and supports the plate in the direction parallel to the one surface of the plate.

15 Claims, 12 Drawing Sheets

IMAGING DEVICE UNIT AND IMAGING APPARATUS FOR REMOVING DUST FROM AN OPTICAL DEVICE

CROSS-REFERENCE TO RELATED PATENT APPLICATION

This application claims the benefit of Japanese Patent Application No. 2008-285351, filed on Nov. 6, 2008, in the Japanese Intellectual Property Office, the entire contents of which is incorporated herein by reference.

BACKGROUND OF THE INVENTION

1. Field of the Invention

The present invention relates to an imaging device unit and an imaging apparatus.

2. Description of the Related Art

As the number of pixels of an imaging device increases, finer pixel density has been obtained. Accordingly, the shadow of a particle such as dust attached to an optical device such as a lens of an imaging device is recorded in a captured image.

Lens surfaces that are accessible to customers may be cleaned by the customers, but surfaces that are not accessible to customers may accumulate particles such as dust. The particles such as dust may be recorded in captured images and diminish image quality.

SUMMARY OF THE INVENTION

The present invention provides an imaging device unit for removing particles attached to an optical device, and an imaging apparatus.

According to an aspect of the present invention, there is provided an imaging device unit including: an imaging device comprising an imaging surface on which an optical image of a subject is formed and configured to convert the optical image into an electric signal; an optical device disposed between the imaging device and the subject; a plate mounted on a peripheral portion of the optical device and comprising a contact portion on one surface of the plate in the direction parallel to the plate; a piezoelectric device mounted on the plate and vibrating the plate and the optical device; and a support frame that surface-contacts with the contact portion of the plate and supports the plate in the direction parallel to the one surface of the plate.

The contact portion may include an arm unit extending in the direction substantially perpendicular to the one surface of the plate, where the support frame surface-contacts with the arm unit of the plate.

The plate may include two arm units facing each other at both ends of the plate. The support frame may include two inner walls facing each other, and the plate may be interposed between the two inner walls of the support frame using the two arm units.

An imaging apparatus is provided. The imaging apparatus may include an imaging optical system that forms an optical image of a subject; an imaging device comprising an imaging surface on which the optical image of the subject is formed by the optical system and configured to convert the optical image into an electric signal; an optical device disposed between the imaging device and the subject; a plate mounted on a peripheral portion of the optical device and comprising a contact portion formed on one surface of the plate in the direction parallel to the surface of the plate; a piezoelectric device mounted on the plate and vibrating the plate and the optical device; and a support frame that surface-contacts with the contact portion of the plate and supports the plate in the direction parallel to the one surface of the plate.

The contact portion may include an arm unit extending in the direction perpendicular to the one surface of the plate, and the support frame may surface-contact with the arm unit of the plate.

The plate may include two arm units facing each other at both ends of the plate. The support frame may include two inner walls facing each other, and the plate may be interposed between the two inner walls of the support frame using the two arm units.

An imaging apparatus is provided. The imaging apparatus including an imaging optical system that forms an optical image of a subject; an imaging device comprising an imaging surface on which the optical image of the subject is formed by the optical system and configured to convert the optical image into an electric signal; an optical device disposed between the imaging device and the subject; a plate mounded around a peripheral portion of the optical device, and the plate hollowed out for light to pass from the subject through the optical device and the hollowed out portion to the imaging device and the plate having at least two arms on each of two opposite sides of the plate, each of the arms extending past an edge of the optical device; two piezoelectric devices mounted on the plate and configured to vibrate; and a support frame with surfaces that contact either directly or indirectly with the arms of the plate and support the plate in a direction towards the subject.

The arms of the plate may extend to a respective inner wall of the support frame.

The arms of the plate may extend to a respective inner wall of the support frame and curve back in a direction toward the imaging device.

Each of the piezoelectric devices may be mounted on the plate longitudinally substantially between two arms.

The piezoelectric devices may be polarized in the optical direction of the imaging lens.

The imaging apparatus may include an electrical circuit to apply voltage to the two piezoelectric devices, where when voltage is applied to the two piezoelectric devices each piezoelectric device moves in a extensional vibration mode such that one of the arms of the at least two arms on each of two opposite sides presses against an inner wall of the support structure and pushes the plate towards the subject so that the plate and the optical device move in three dimensions to remove particles from the optical device.

The electric circuit may apply reverse-phase periodic voltage to the two piezoelectric devices.

The electric circuit may apply same-phase periodic voltage to the two piezoelectric devices.

At least one arm may be fixed to an inner wall of the support structure.

The imaging apparatus may include another support structure. The two piezoelectric devices may be mounted either directly or indirectly on the second support structure, and the another support structure may provide support in substantially the opposite direction of the support structure.

A first buffer member may be interposed between the piezoelectric device and the another support structure so that vibration is inhibited from the piezoelectric device to the another support frame.

A second buffer member may be interposed between the plate and the support structure so that vibration is inhibited from the piezoelectric device to the support structure.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Therefore, there is a need in the art for an imaging device unit including an imaging device comprising an imaging surface on which an optical image of a subject is formed and configured to convert the optical image into an electric signal; an optical device disposed between the imaging device and the subject; a plate mounted on a peripheral portion of the optical device and comprising a contact portion on one surface of the plate in the direction parallel to the plate; a piezoelectric device mounted on the plate and vibrating the plate and the optical device; and a support frame that surface-contacts with the contact portion of the plate and supports the plate in the direction parallel to the one surface of the plate.

Hereinafter, the present invention will now be described more fully with reference to the accompanying drawings, in which exemplary embodiments of the invention are shown. In the drawings, like reference numerals denote like elements.

Figure 1:
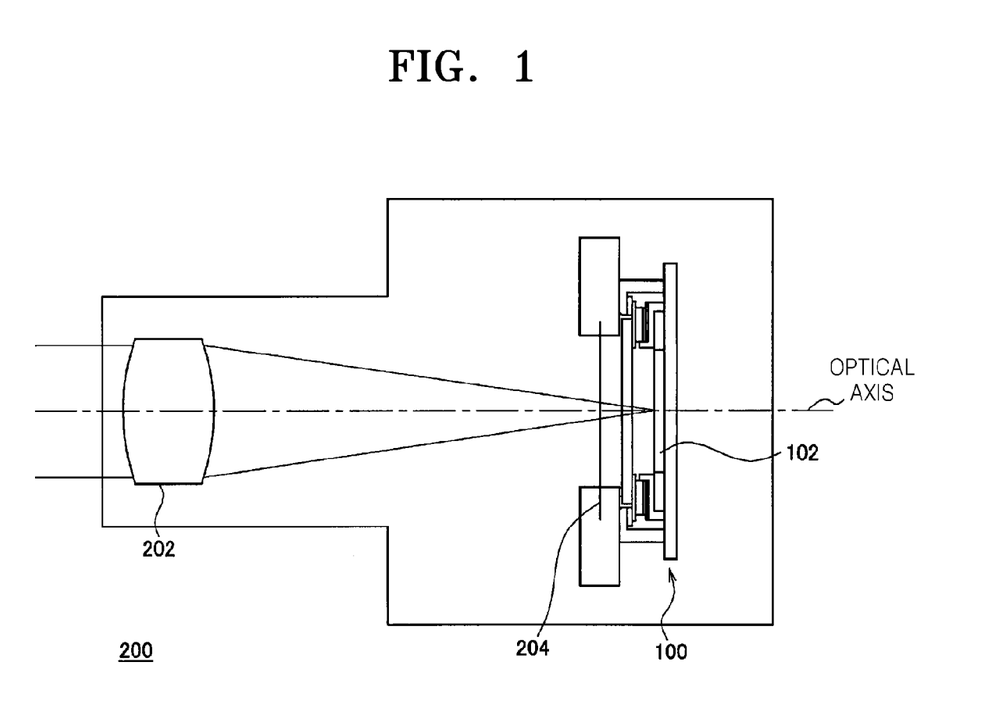
FIG. 1 is a cross-sectional view of an example of an imaging apparatus.

FIG. 1 is a cross-sectional view of an example of an imaging apparatus 200. The imaging apparatus 200 includes an imaging lens 202 disposed in a main body of the imaging apparatus 200 and a focus adjusting device (not shown) for adjusting a position on which an image is formed by moving the entire or a part of the imaging lens 202 in the direction of an optical axis.

An imaging device unit 100 is disposed on the opposite side of a subject with respect to the imaging lens 202. The imaging device unit 100 is a photoelectric device including an imaging device 102 including a sensor such as a charge-coupled device (CCD) and a complementary metal oxide semiconductor (CMOS). An image of a subject is formed on an imaging surface of the imaging device 102 by the imaging lens 202.

In addition, a shutter 204 for adjusting light exposure of the imaging device 102 is disposed between the imaging lens 202 and the imaging device unit 100. The imaging device unit 100 is fixed in the main body by a supporting unit (not shown).

Figure 2:
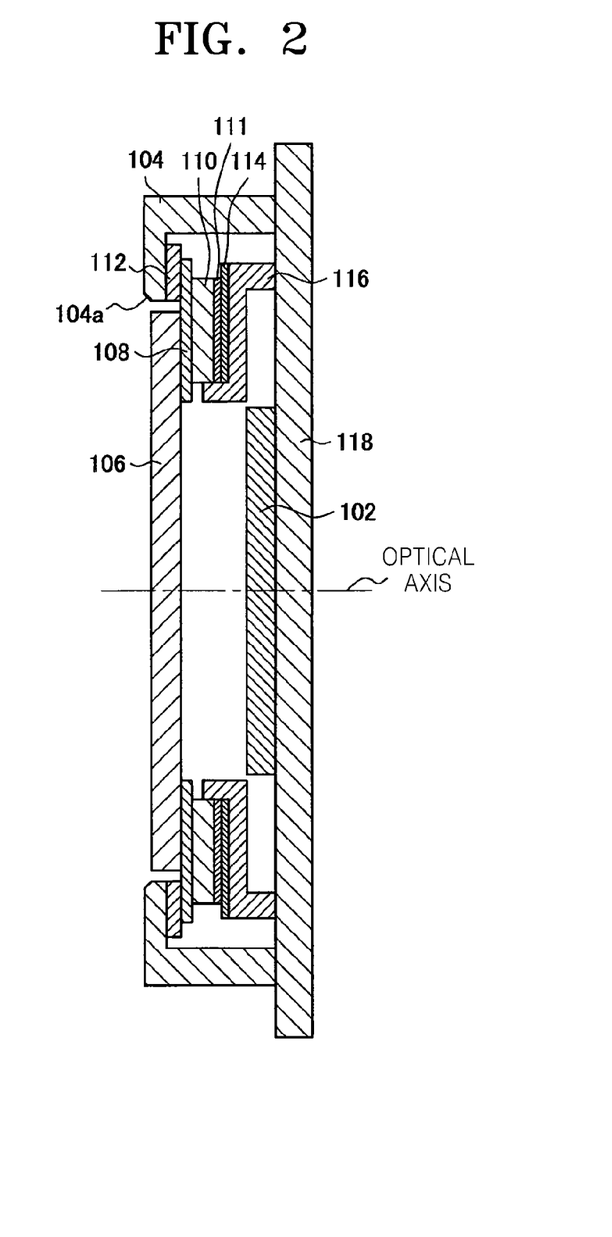
FIG. 2 is an enlarged cross-sectional view of the imaging device unit of FIG. 1.

FIG. 2 is an example of an enlarged cross-sectional view of the imaging device unit 100 of FIG. 1. As shown in FIG. 2, the imaging device unit 100 includes the imaging device 102, a support frame 104, a low pass filter (LPF) 106, a metal plate 108, a piezoelectric device 110, a flexible printed circuit board 111, buffer members 112 and 114, an internal support frame 116, and a substrate 118. According to the present embodiment, the LPF 106 is used as an optical device that is vibrated by the piezoelectric device 110, where the optical device may also be a lens, a glass plate, or the like.

In FIG. 2, the imaging device 102 is mounted on the substrate 118, and the substrate 118 is fixed to the support frame 104 and the internal support frame 116. The imaging device 102 is supported by the substrate 118 such that an imaging surface can be disposed at the opening 104a of the support frame 104.

The piezoelectric devices 110 are disposed at the upper and lower portions to the optical axis. The flexible printed circuit board 111 that sends a signal to the piezoelectric device 110 is attached to one surface of the piezoelectric device 110 which is close to the imaging device 102. The piezoelectric device 110 and the flexible printed circuit board 111 are disposed on the internal support frame 116 with the buffer member 114 therebetween.

Figure 3:
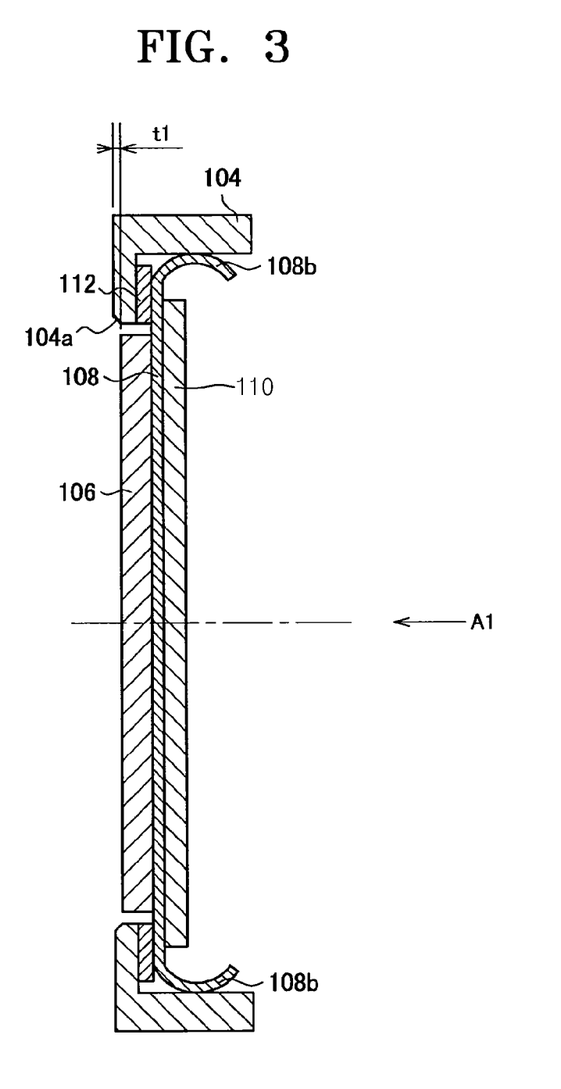
FIG. 3 is a cross-sectional view of an example of a portion of the imaging device unit viewed from the surface of the imaging device unit illustrating an alignment of a support frame, a LPF, a metal plate and a piezoelectric device.

In addition, the piezoelectric device 110 is fixed to the LPF 106 with the metal plate 108 therebetween, and the metal plate 108 is mounted on the support frame 104 with the buffer member 112 therebetween. FIG. 3 is a cross-sectional view of an example of a portion of the imaging device unit 100 viewed from the surface of the imaging device unit illustrating an alignment of the support frame 104, the LPF 106, the metal plate 108 and the piezoelectric device 110 of FIG. 2.

As shown in FIG. 3, the metal plate 108 is disposed on a surface of the LPF 106 which is close to the imaging device 102. The metal plate 108 is attached to the LPF 106 using an adhesive such as epoxy adhesive and UV curable adhesive.

Figure 4:
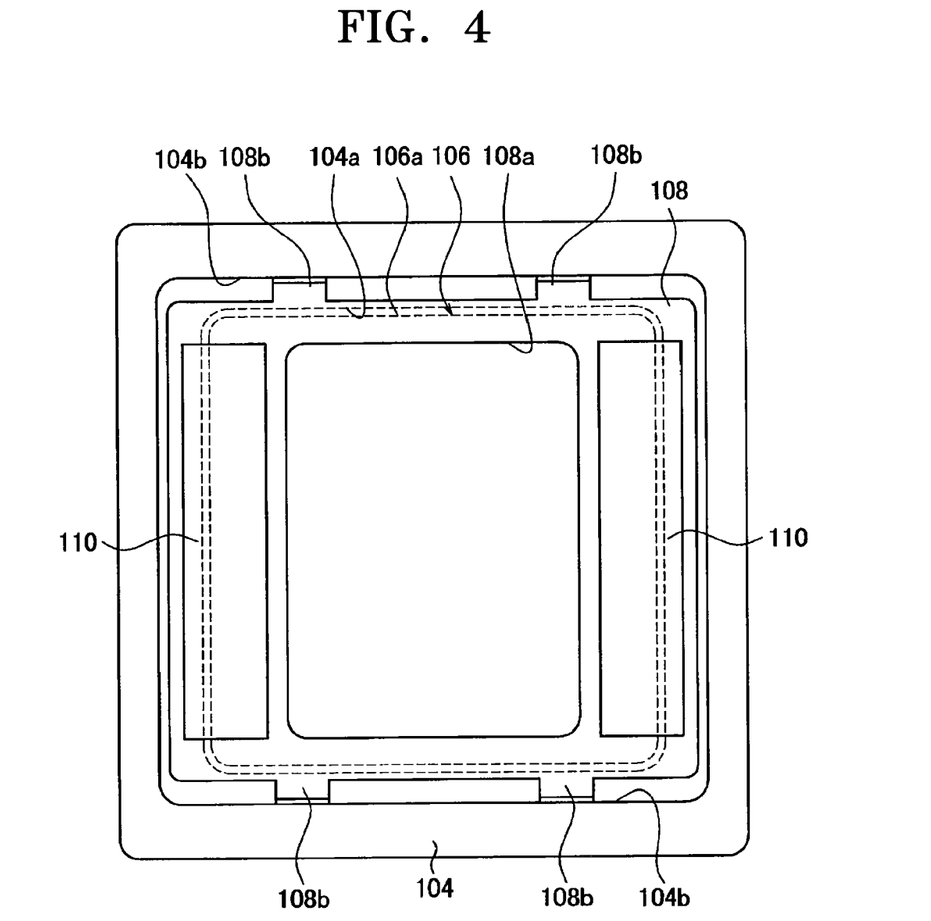
FIG. 4 is an example of a plan view of the portion of the imaging device unit of FIG. 3 viewed in the direction of an arrow A1 of FIG. 3.

FIG. 4 is a plan view of an example of the portion of the imaging device unit 100 of FIG. 3 viewed in the direction of an arrow A1 of FIG. 3. As shown in FIG. 4, the LPF 106 has a rectangular shape with R shapes at each corner. The LPF 106 is inserted in a rectangular opening 104a disposed in the support frame 104. The metal plate 108 includes an outer appearance which has a larger rectangular shape than an outer appearance 106a of the LPF 106. In addition, the metal plate 108 includes an opening 108a which is narrower than the outer appearance 106a of the LPF 106. Thus, the metal plate 108 is adhered to the LPF 106 using a region between the opening 108a of the metal plate 108 and the outer appearance 106a of the LPF 106 as a contact surface.

As shown in FIG. 3, the piezoelectric device 110 is attached to the surface of the metal plate 108 which is close to the imaging device 102. As shown in FIG. 4, two piezoelectric devices 110 are mounted on both sides of the metal plate 108. In addition, a periodical voltage is applied the each of the piezoelectric devices 110 from the flexible printed circuit board 111. Each of the piezoelectric devices 110 is polarized in the thickness direction (the optical direction of the imaging lens 102) of the piezoelectric device 110, and a periodic voltage is applied to the surface of piezoelectric material using an oscillator generating periodic signals. The periodic signal may be a square wave or a sine wave. In addition, periodic voltages having the same phase may be applied to the piezoelectric device 110, or a reverse-phase periodic voltage may be applied to the piezoelectric device 110. If voltage is applied to the piezoelectric device 110, the piezoelectric device 110 moves in an extensional vibration mode in the lengthwise direction of the piezoelectric device 110 itself. In this regard, the metal plate 108 attached to the piezoelectric device 110 hardly extends in the extensional direction of the piezoelectric device 110, and thus, a complex member including the piezoelectric device 110, the metal plate 108 and the LPF 106 undergoes a bending vibration due to the difference of their extension rates. Accordingly, a material point of an antinode of the bending vibration in the piezoelectric device 110 vibrates in the optical axis direction and has a maximum pulse width. In addition, at a node of the bending vibration, a pulse width of a material point is zero (0), and thus only a rotational vibration occurs. Between the antinode and the node of the bending vibration, a material point vibrates in a circular arc about the nearest node from the material point.

As such, the metal plate 108 attached to the piezoelectric device 110 undergoes a bending motion according to the extensional motion of the piezoelectric device 110, and the LPF 106 attached to the metal plate 108 undergoes the bending motion together with the metal plate 108. Thus, due to the bending motion of the LPF 106, impurities such as dust motes and particles attached to the surface of the LPF 106 which is close to the subject may be removed.

The buffer member 112 is interposed between the metal plate 108 and the support frame 104. In addition, the buffer member 114 is interposed between the piezoelectric device 110 and the internal support frame 116. Thus, the vibration is inhibited from the piezoelectric device 110 to the support frame 104 and the internal support frame 116.

In addition, the buffer member 112 is disposed around the metal plate 108. Thus, as shown in FIG. 2, if the support frame 104, the buffer member 112, the metal plate 108, the LPF 106, and the substrate 118 are installed, a space between the LPF 106 and the imaging device 102 is sealed. Thus, this may inhibit dust from being attached to the imaging surface of the imaging device 102 and the surface of the LPF 106 which is close to the imaging device 102.

According to the present embodiment, by increasing the outer appearance of the metal plate 108 to be greater than the outer appearance 106a of the glass of the LPF 106, the space is secured at the peripheral portion of the surface of the metal plate 108 with is close to the imaging device 102. Accordingly, the surface of the support frame 104 which is close to the imaging device 102 may be closely adhered to the metal plate 108, so that the LPF 106 and the piezoelectric device 110 may be maintained.

In this regard, if the LPF 106 is directly adhered to the support frame 104, the support frame 104 and the LPF 106 are disposed in the direction of the optical axis, and a large space is required in the optical axis.

Figure 5:
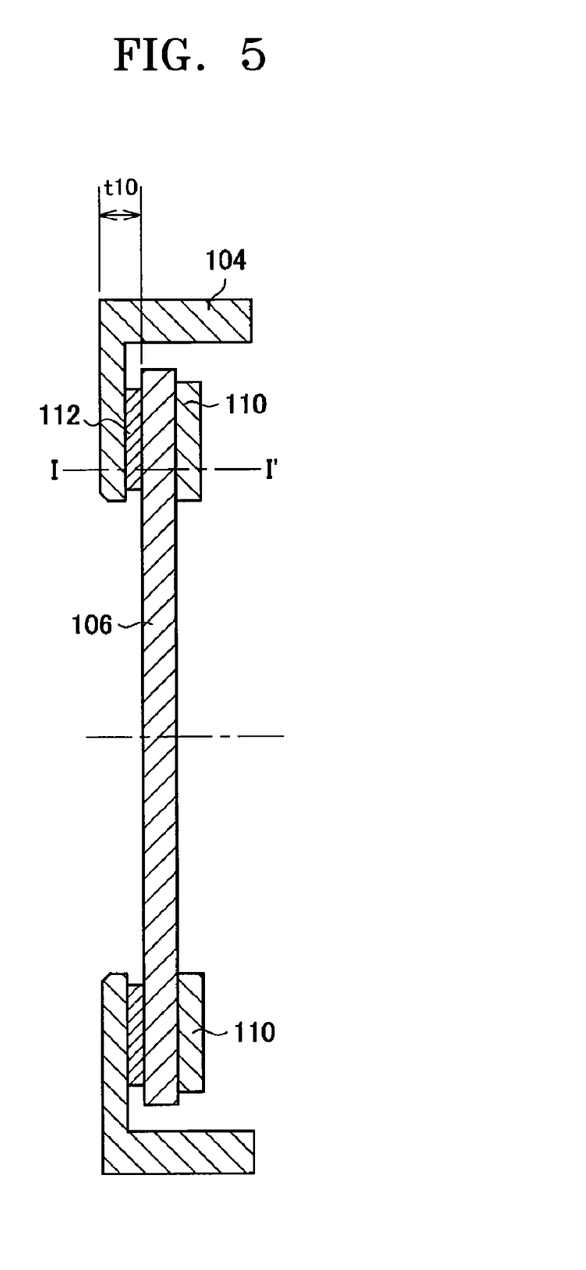
FIG. 5 is a cross-sectional view of an example of a portion of the imaging device unit according to a comparative embodiment illustrating the LPF closely adhered to a support frame with a buffer member therebetween.

FIG. 5 is a cross-sectional view of a portion of the imaging device unit according to a comparative example illustrating the LPF 106 closely adhered to the support frame 104 with the buffer member 112 therebetween. In this regard, since the support frame 104, the buffer member 112, the LPF 106, and the piezoelectric device 110 are piled up in the optical direction in the view taken along line I-I', a distance t10 from one surface of the support frame 104 which is close to the subject to one surface of the LPF 106 which is close to the subject increases, as compared to the imaging device unit 100 of FIG. 2.

In addition, in FIG. 3, since the support frame 104 is disposed at an external portion of the outer perimeter of the LPF 106, and the support frame 104 and the LPF 106 are not overlapping in the optical direction, a distance between the surface of the support frame 104 which is close to the subject and the surface of the LPF 106 which is close to the subject may be sufficiently reduced. Accordingly, the thickness of the imaging device unit 100 may be reduced, and thus the size of the imaging device unit 100 may be reduced.

In addition, in FIG. 5, in order to fix the piezoelectric device 110 to the LPF 106, the outer appearance 106a of the LPF 106 needs to be sufficiently larger than the opening 104a of the support frame 104, and a large region in which the LPF 106 and the support frame 104 are overlapped in the optical axis needs to be secured. Thus, the outer appearance 106a of the LPF 106 is increased to increase the outer appearance of the support frame 104. Thus, the size of the imaging device unit 100 increases.

However, in FIG. 3, the metal plate 108 is fixed to the support frame 104, a region for closely adhering to the LPF 106 is not required in the outer perimeter of the LPF 106. Thus, the size of the LPF 106 may be reduced, and the size of the imaging device unit 100 may be reduced in a direction perpendicular to the optical axis. In addition, due to the reduction in the size of the LPF 106, manufacturing costs may be reduced.

As shown in FIG. 3, the metal plate 108 includes two arm units 108b facing each other at both ends of the metal plate 108. The arm units 108b are curved in a direction toward the imaging device 102 from the metal plate 108. When the metal plate 108 is mounted on the support frame 104, the arm unit 108b is curved inward (toward the optical axis) to contact the inner wall 104b of the support frame 104. Accordingly, as shown in FIG. 3, the metal plate 108 with two arm units 108b facing each other and curved inward is fixed to the inner wall 104b of the support frame 104. That is, the metal plate 108 with two arm units 108b curved inward is interposed between two inner walls 104b of the support frame 104.

Figure 6:
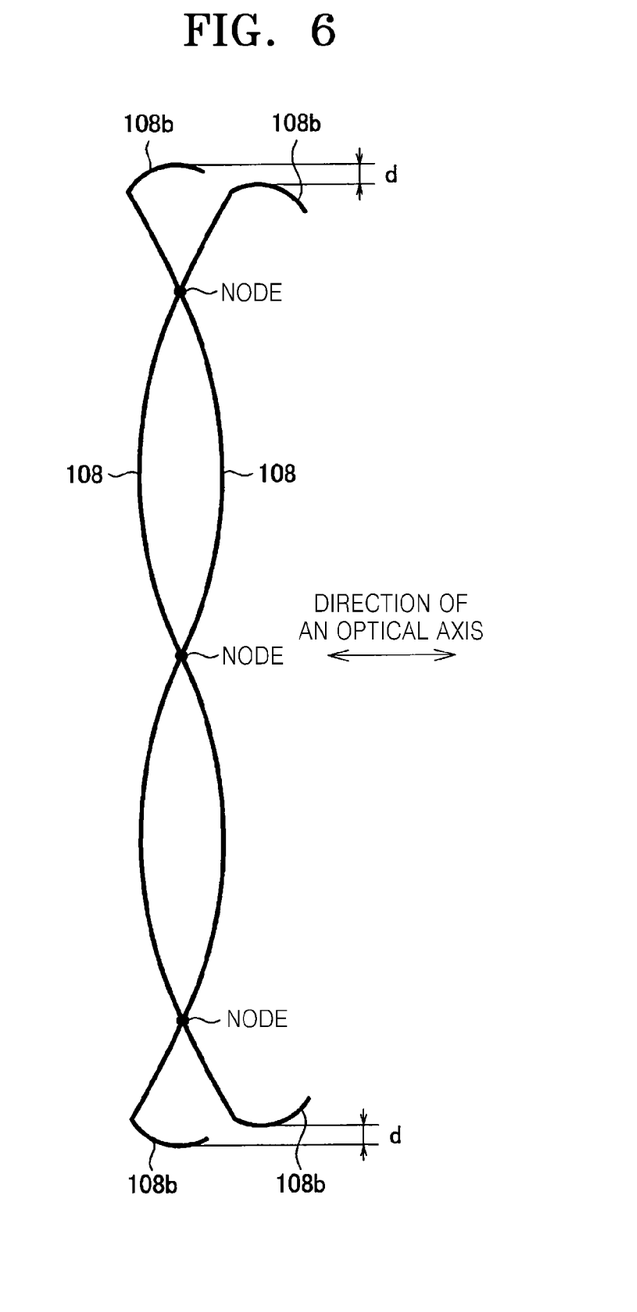
FIG. 6 schematically illustrates an example of vibration of the metal plate in a vibration mode with three nodes.

FIG. 6 schematically illustrates an example of vibration of the metal plate 108 in a vibration mode with three nodes. As shown in FIG. 6, if the metal plate 108 vibrates by a stationary wave, contact portions of the arm unit 108b between the arm units 108b and the inner walls 104b slightly move by a distance d in a direction perpendicular to the optical axis.

Figure 7:
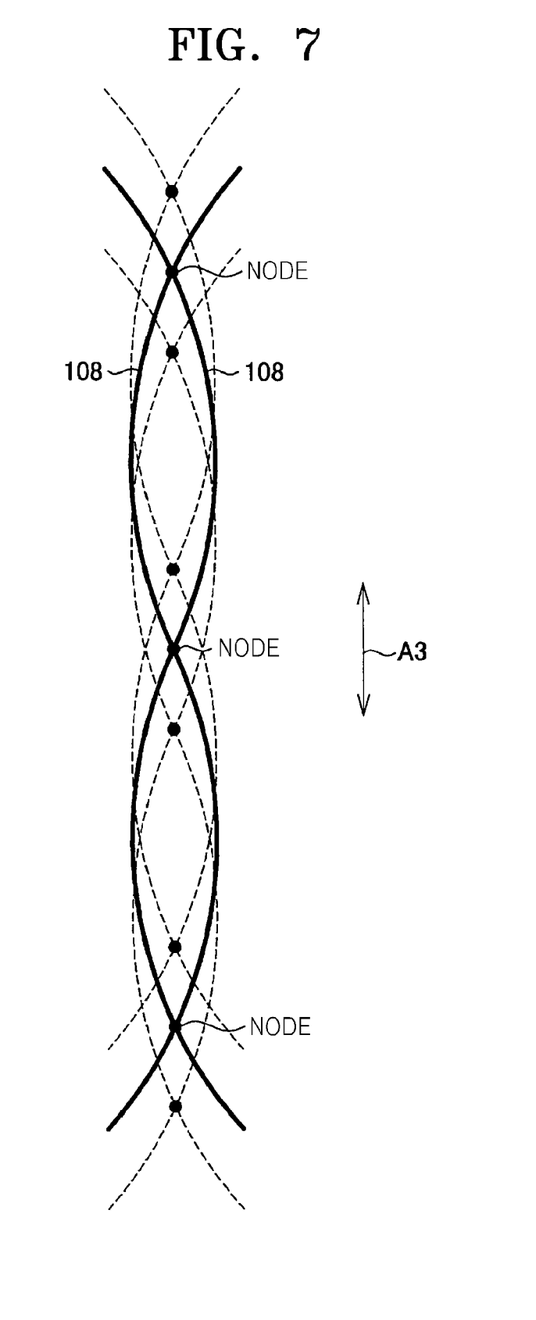
FIG. 7 schematically illustrates an example of vibration of the metal plate in a vibration mode with three nodes in a direction perpendicular to the optical axis.

Thus, if the metal plate 108 interposed between the inner walls 104b of the support frame 104 vibrates, the contact portions of the arm unit 108b between the arm units 108b and the inner walls 104b move in a direction perpendicular the optical axis to vibrate the entire metal plate 108 in the direction perpendicular to the optical axis. Accordingly, as shown in FIG. 7, the metal plate 108 may vibrate in the direction perpendicular to the optical axis (in the direction of an arrow A3) in the vibration mode with three nodes. Even though the metal plate 108 vibrates in the vibration mode with three nodes in FIGS. 6 and 7, the number of nodes is not limited thereto. The metal plate 108 may vibrate in a vibration mode with two or more nodes.

Dust and particles attached to the LPF 106 are generally removed by the vibration of the LPF 106 in the direction of the optical axis, but may not be removed if dust and particles are attached to the LPF 106 with strong adhesion.

According to the present embodiment, the vibration of the piezoelectric device 110 generates a stationary wave to vibrate the surface of the LPF 106 in the direction of the optical axis. At the same time, the arm unit 108b may vibrate the LPF 106 in the direction perpendicular to the optical axis. Accordingly, the surface of the LPF 106 may three-dimensionally vibrate rather than two-dimensionally vibrate. Thus, release forces may be applied to the dust motes attached to the surface of the LPF 106 in various directions, and thus impurities, such as dust motes, and particles attached with strong adhesion may be more efficiently removed.

Figure 8A:
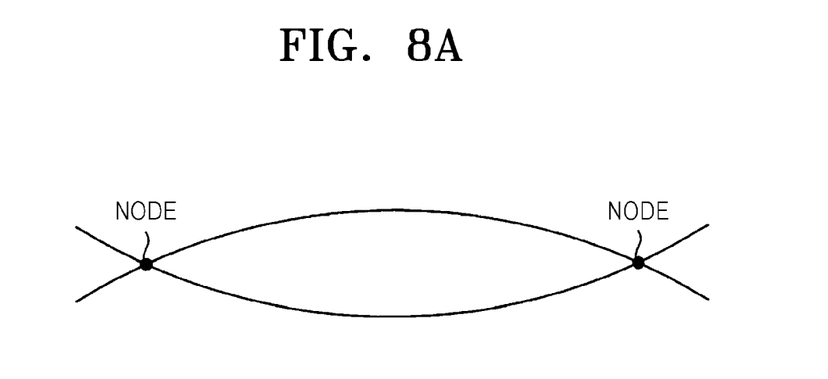
FIGS. 8A and 8B illustrate examples of vibration generated by reversing a bending motion phase of upper and lower piezoelectric devices.
Figure 8B:
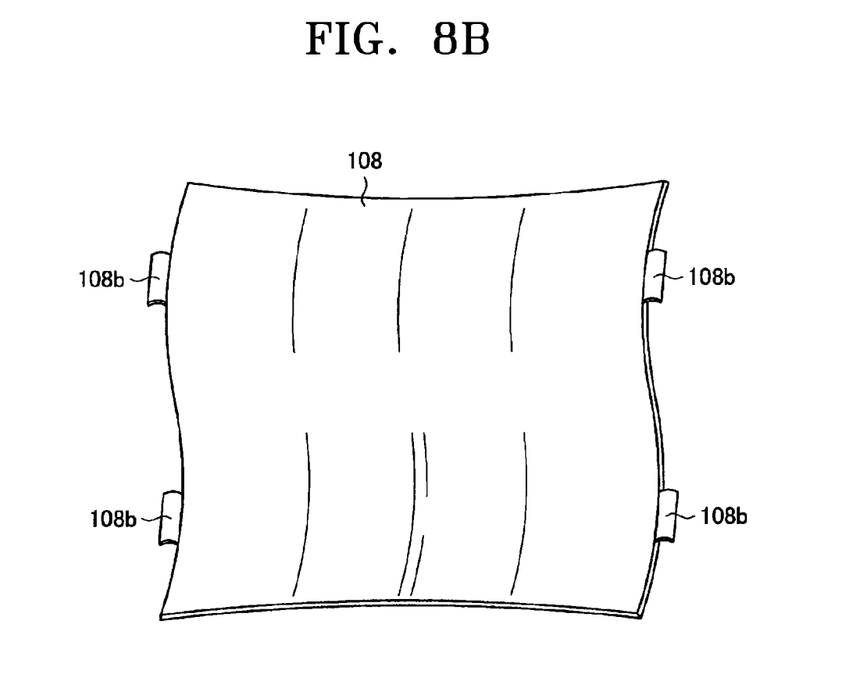
Figure 9:
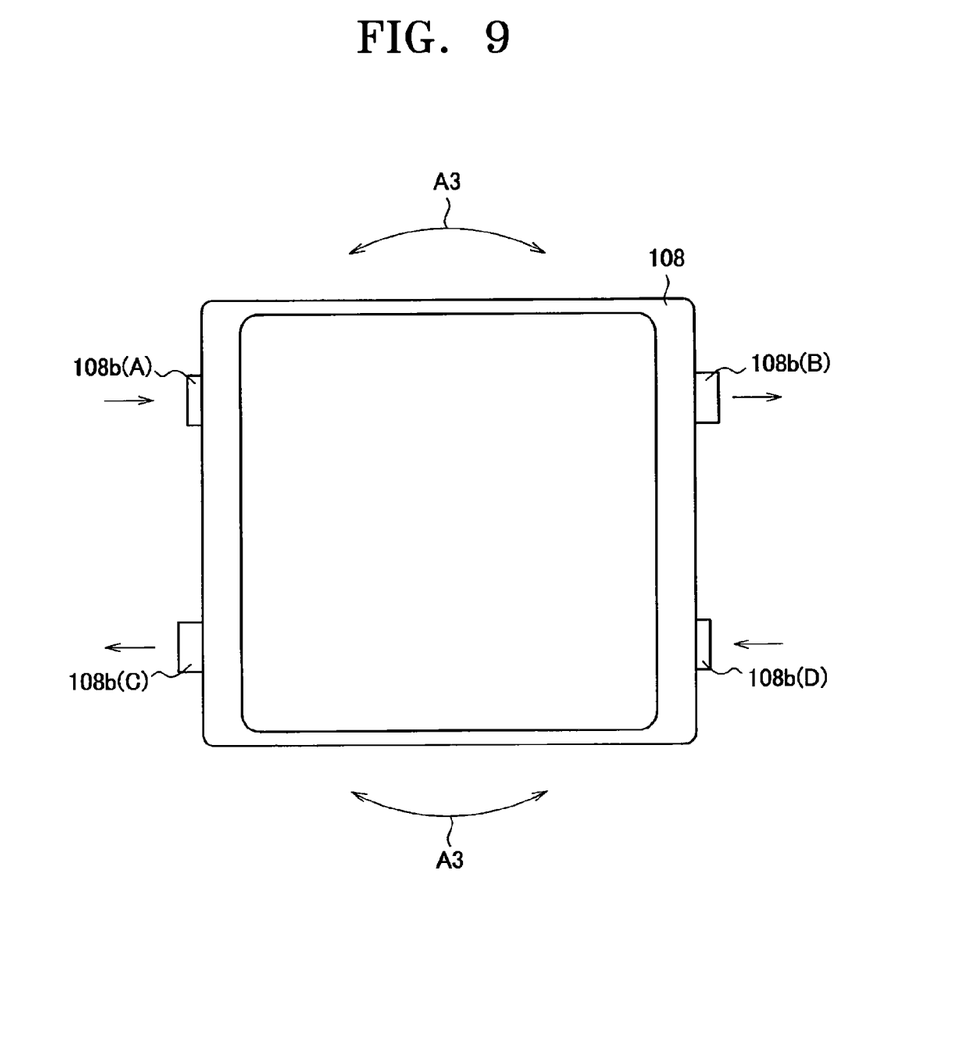
FIG. 9 illustrates an example of vibration generated by reversing a bending motion phase of upper and lower piezoelectric devices.

A three-dimensional vibration of the metal plate 108 will now be described. As shown in FIG. 4, the metal plate 108 includes two pairs of the arm units 108b facing each other and disposed at two sides of the metal plate 108 facing each other. FIGS. 8A and 8B illustrate examples of vibration generated by reversing a bending motion phase of upper and lower piezoelectric devices 110 by a vibration mode with two nodes. In more detail, FIG. 8A illustrates the vibration mode, and FIG. 8B schematically illustrates the vibration of the metal plate 108. As shown in FIG. 9, if the arm unit 108b (A) and arm unit 108b (D) are deformed to be closer to the metal plate 108, the arm unit 108b (B) and arm unit 108b (C) are deformed to be farther from the metal plate 108.

Figure 10:
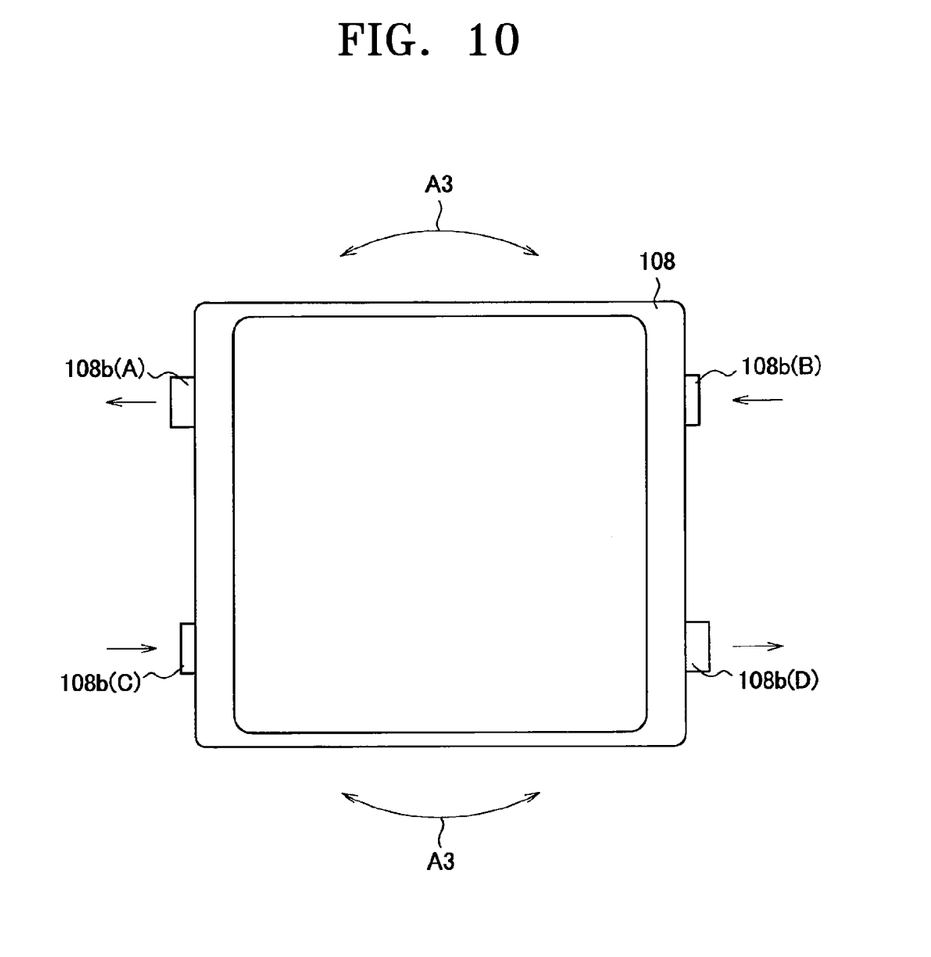
FIG. 10 illustrates an example of vibration generated by reversing a bending motion phase of upper and lower piezoelectric devices.

The example of FIG. 10 illustrates that if the arm unit 108b (A) and arm unit 108b (D) are deformed to be farther from the metal plate 108, the arm unit 108b (B) and arm unit 108b (C) are deformed to be closer to the metal plate 108. As such if the upper and lower piezoelectric devices 110 vibrate in a reverse phase by the vibration mode with two nodes, the left and right bending and the up and down bending are mixed. Thus, while the diagonal length between the arm unit 108b (A) and the arm unit 108b (D) extends, the diagonal length between the arm unit 108b (B) and the arm unit 108b (C) shrinks.

Thus, by repeating the states shown in FIGS. 9 and 10, the metal plate 108 interposed between the inner walls 104b of the support frame 104 repeatedly vibrates in a circular arc shape in the direction of an arrow A3 shown in FIGS. 9 and 10. Thus, the metal plate 108 three-dimensionally vibrates to completely remove particles attached to the LPF 106.

Figure 11A:
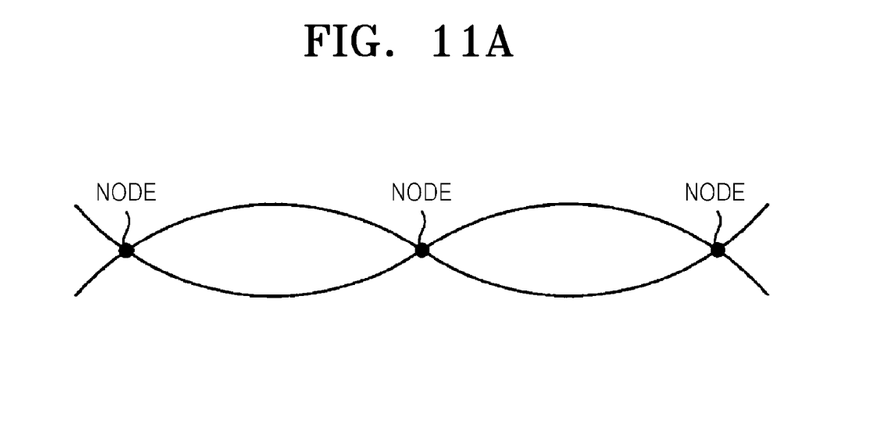
FIGS. 11A and 11B illustrate examples of vibration of two piezoelectric devices in a vibration mode with three nodes in the same phase.
Figure 11B:
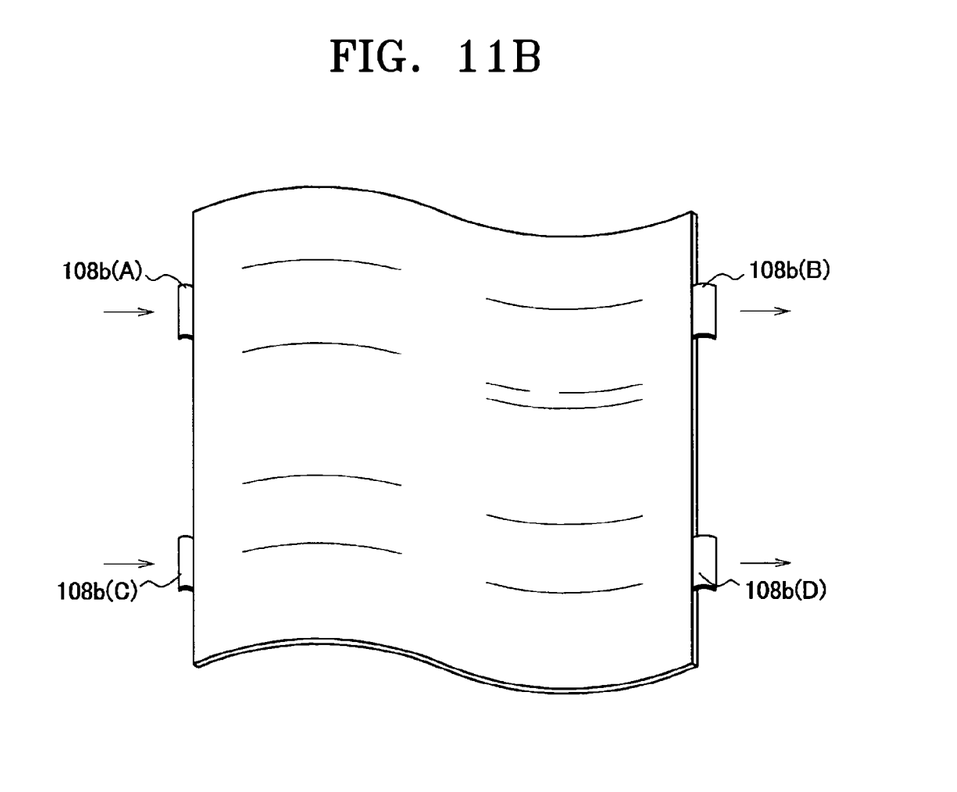
Figure 12:
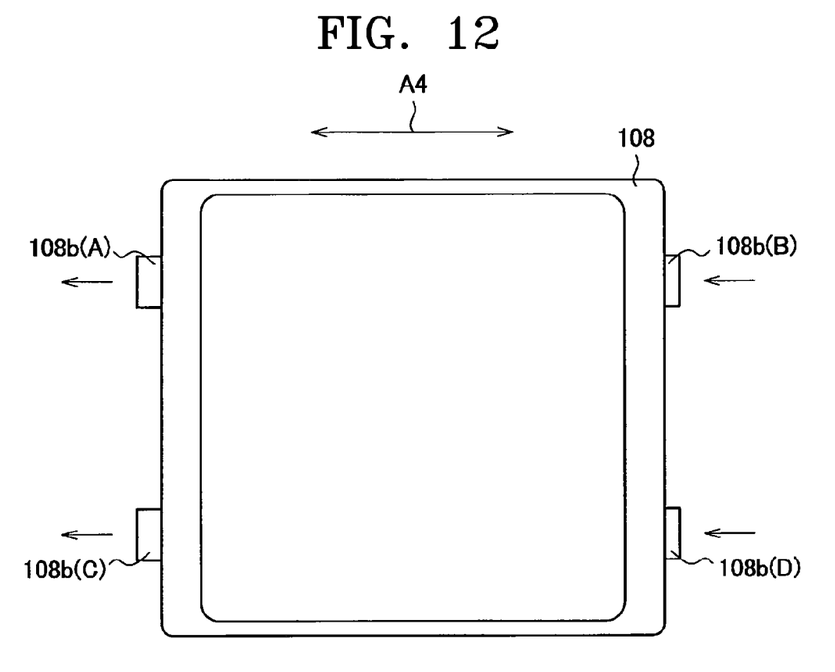
FIG. 12 illustrates an example of vibration of two piezoelectric devices in a vibration mode with three nodes in the same phase.

FIGS. 11A and 11B illustrate an example of vibration of two piezoelectric devices 110 in a vibration mode with three nodes in the same phase. FIG. 11A schematically illustrates the vibration mode, and FIG. 11B schematically illustrates the vibration of the metal plate 108. In this regard, as shown in FIG. 12, if the arm unit 108b (B) and arm unit 108b (D) are deformed to be closer to the metal plate 108, the arm unit 108b (A) and arm unit 108b (C) are deformed to be farther from the metal plate 108. In addition, as shown in FIG. 13, if the arm unit 108b (B) and arm unit 108b (D) are deformed to be farther from the metal plate 108, the arm unit 108b (A) and arm unit 108b (C) are deformed to be closer to the metal plate 108.

Figure 13:
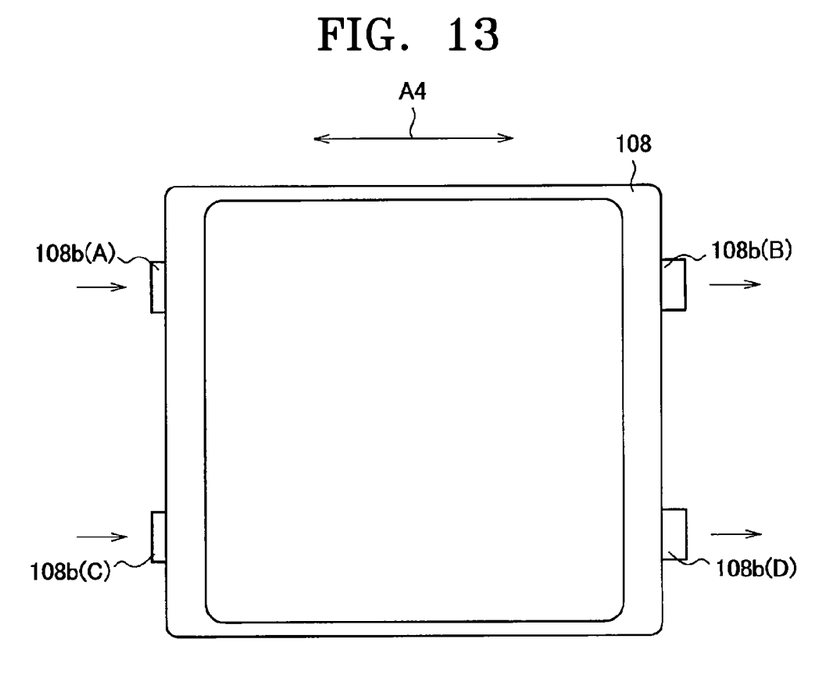
FIG. 13 illustrates an example of vibration of two piezoelectric devices in a vibration mode with three nodes in the same phase.

Thus, by repeating the states shown in FIGS. 12 and 13, the metal plate 108 interposed between the inner walls 104b of the support frame 104 repeatedly vibrates in the direction of an arrow A4 shown in FIGS. 12 and 13. Thus, the metal plate 108 three-dimensionally vibrates to completely remove particles attached to the LPF 106.

According to the present embodiment, the metal plate 108 is installed around the LPF 106, and the arm units 108b of the metal plate 108 are interposed between inner walls 104b of the support frame 104. Thus, the LPF 106 may vibrate in the direction perpendicular to the optical axis when the surface of the LPF 106 vibrates in the optical direction according to the bending motion of the piezoelectric device 110. Thus, dust and particles attached to the LPF 106 may be completely removed by the three-dimensional vibration.

For example, even though the arm units 108b of the metal plate 108 are interposed between the inner walls 104b of the support frame 104 which face each other according to embodiments of the present invention, one arm unit 108b of the metal plates 108 may be fixed to one inner wall 104b, and the other arm unit 108b may not surface-contact with the other inner wall 104b and remain free. In this regard, as described with reference to FIG. 6, since the metal plate 108 vibrates in the direction perpendicular to the optical axis due to the bending motion of the piezoelectric device 110, the metal plate 108 may vibrate in a direction with respect to the inner wall 104b to which the metal plate 108 is fixed.

According to embodiments of the present invention, provided are an imaging device unit and an imaging apparatus that removes particles attached to an optical device.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging device unit comprising:
   an imaging device comprising an imaging surface on which an optical image of a subject is formed and configured to convert the optical image into an electric signal;
   an optical device disposed between the imaging device and the subject;
   a plate mounted on a peripheral portion of the optical device and comprising a contact portion on one surface of the plate in the direction parallel to the plate;
   a piezoelectric device mounted on the plate and configured to vibrate the plate and the optical device; and
   a support frame that surface-contacts with the contact portion of the plate and supports the plate in the direction parallel to the one surface of the plate, wherein the contact portion comprises an arm unit extending in the direction substantially perpendicular to the one surface of the plate, and wherein
   the support frame surface-contacts with the arm unit of the plate, and the arm unit of the plate extends to a respective inner wall of the support frame and curves back in a direction toward the imaging device.

2. The imaging device unit of claim 1, wherein the plate comprises two arm units facing each other at both ends of the plate,
   the support frame comprises two inner walls facing each other, and
   the plate is interposed between the two inner walls of the support frame using the two arm units.

3. An imaging apparatus comprising:
   an imaging optical system that forms an optical image of a subject;
   an imaging device comprising an imaging surface on which the optical image of the subject is formed by the optical system and configured to convert the optical image into an electric signal;
   an optical device disposed between the imaging device and the subject;
   a plate mounted on a peripheral portion of the optical device and comprising a contact portion formed on one surface of the plate in the direction parallel to the surface of the plate;

a piezoelectric device mounted on the plate and configured to vibrate the plate and the optical device; and a support frame that surface-contacts with the contact portion of the plate and supports the plate in the direction parallel to the one surface of the plate, wherein the contact portion comprises an arm unit extending in the direction perpendicular to the one surface of the plate, and wherein the support frame surface-contacts with the arm unit of the plate, and the arm unit of the plate extends to a respective inner wall of the support frame and curves back in a direction toward the imaging device.

4. The imaging apparatus of claim 3, wherein the plate comprises two arm units facing each other at both ends of the plate, the support frame comprises two inner walls facing each other, and the plate is interposed between the two inner walls of the support frame using the two arm units.

5. An imaging apparatus comprising:

an imaging optical system that forms an optical image of a subject;

an imaging device comprising an imaging surface on which the optical image of the subject is formed by the optical system and configured to convert the optical image into an electric signal;

an optical device disposed between the imaging device and the subject;

a plate mounted around a peripheral portion of the optical device, and the plate having a hollow portion for light to pass from the subject through the optical device and the hollow portion to the imaging device and the plate having at least two arms on each of two opposite sides of the plate, each of the arms extending past an edge of the optical device;

two piezoelectric devices mounted on the plate and configured to vibrate; and a support frame with surfaces that contact either directly or indirectly with the arms of the plate and support the plate from moving substantially towards the subject wherein the arms of the plate extend to a respective inner wall of the support frame and curve back in a direction toward the imaging device.

6. The imaging apparatus of claim 5, wherein the arms of the plate extend to a respective inner wall of the support frame.

7. The imaging apparatus of claim 5, wherein each of the piezoelectric devices are mounted on the plate longitudinally substantially between two arms.

8. The imaging apparatus of claim 5, wherein the piezoelectric devices are polarized in the optical direction of the imaging lens.

9. The imaging apparatus of claim 5, the imaging apparatus comprising an electrical circuit to apply voltage to the two piezoelectric devices, wherein when voltage is applied to the two piezoelectric devices each piezoelectric device moves in a extensional vibration mode such that one of the arms of the at least two arms on each of two opposite sides presses against an inner wall of the support frame and pushes the plate towards the subject so that the plate and the optical device move in three dimensions to remove particles from the optical device.

10. The imaging apparatus of claim 9, wherein the electric circuit applies reverse-phase periodic voltage to the two piezoelectric devices.

11. The imaging apparatus of claim 9, wherein the electric circuit applies same-phase periodic voltage to the two piezoelectric devices.

12. The imaging apparatus of claim 5, wherein at least one arm is fixed to an inner wall of the support frame.

13. The imaging apparatus of claim 5, the imaging apparatus comprising another support frame, wherein the two piezoelectric devices are mounted either directly or indirectly on the another support frame and wherein the another support frame provides support in substantially the opposite direction of the support frame.

14. The imaging apparatus of claim 13, wherein first buffer members are interposed between the two piezoelectric devices and the another support frame so that vibration is inhibited from the two piezoelectric devices to the another support frame.

15. The imaging apparatus of claim 5, wherein second buffer members are interposed between the plate and the support frame so that vibration is inhibited from the piezoelectric device to the support frame.

* * * * *